UNITED STATES PATENT OFFICE.

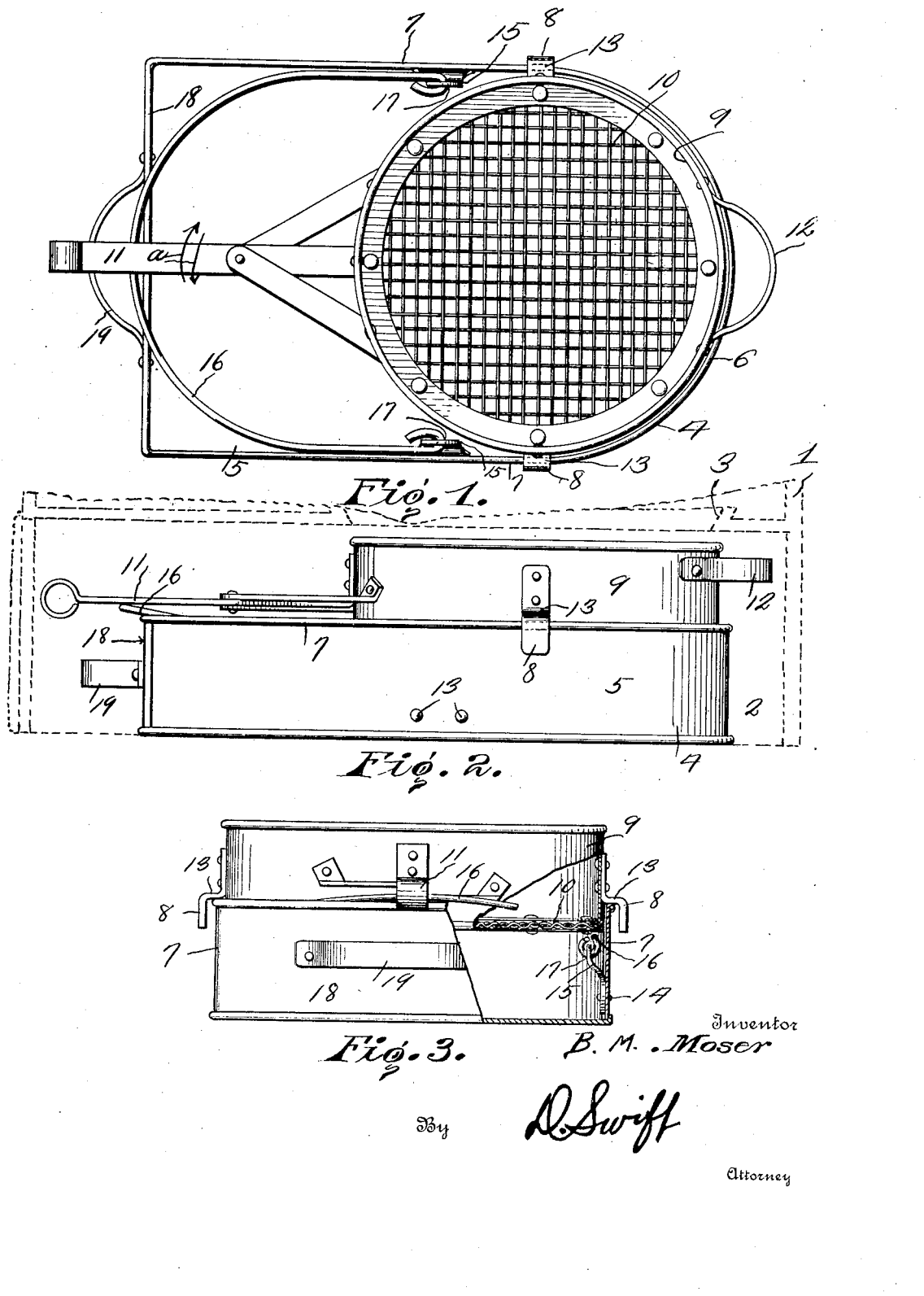

BERNARD M. MOSER, OF OSHKOSH, WISCONSIN.

ASH-SIFTER.

1,354,835.   Specification of Letters Patent.   Patented Oct. 5, 1920.

Application filed February 18, 1920. Serial No. 359,726.

*To all whom it may concern:*

Be it known that I, BERNARD M. MOSER, a citizen of the United States, residing at Oshkosh, in the county of Winnebago, State of Wisconsin, have invented a new and useful Ash-Sifter; and I do hereby declare the following to be a full, clear, and exact description of the invention, such as will enable others skilled in the art to which it appertains to make and use the same.

The invention relates to ash sifters and has for its object to provide a sifter comprising a pan and a sifting receptacle disposed on said pan so that the pan and sifting receptacle may be disposed within the ash pit of a furnace, stove, or the like and the ashes which fall from the fire pot collected in the sifting receptacle. Said sifting receptacle being so mounted on the pan so that it may be reciprocated on the marginal edges of the pan so that the sifting operation, of the ashes may be done within the furnace, thereby reducing the disturbance of the fine particles of ash to a minimum and preventing the same from flying and dirtying of the room in which the furnace or stove is located.

A further object is to form the rear end of the pan with a round contour so that when the ash sifter which is round and supported on the flanges of the pan by loosely mounted ears, is shaken by the operator who grasps the handle and moves the same from side to side, said round portion of the pan will allow the sifter pan ears to move sufficiently so as to accomplish a sifting operation. The sifting receptacle being detachably mounted on the pan so that after a sifting operation the cinders within the sifter may be again deposited on the fire by simply removing the sifter from the ash pit, leaving the pan within the ash pit.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the sifter showing the same mounted on the pan.

Fig. 2 is a side elevation of the sifter and pan, showing the same disposed within an ash pit.

Fig. 3 is a front elevation of the sifter and pan part being broken away to show the interior structure.

Referring to the drawings, the numeral 1 designates a portion of a conventional form of furnace and 2 the ash pit thereof. Furnace 1 being provided with a conventional form of fire pot 3 and beneath said fire pot the sifting device 4 is disposed. Sifting device 4 comprises a pan 5 which pan has its rear end 6 rounded, the purpose of which will presently appear. Supported on the longitudinal sides 7 of the pan 5 by means of loosely mounted ears 8 is a round sifting receptacle 9, said receptacle being provided with a wire mesh 10, through which mesh the fine particles of ash will pass and fall into the receptacle 5 during a sifting operation. The ashes as they fall from the fire pot 3 will be deposited in the receptacle 9 and when it is desired to sift the same the operator grasps the handle 11 which is secured to one side of the sifting receptacle 9 and moves the same forwardly and backwardly which will cause the ashes within the sifting receptacle 9 to be sifted, after which the sifting receptacle 9 may be removed from the receptacle 10 and the cinders, if so desired, deposited on the fire. By loosely mounting the ears 8 on the side 7 of the receptacle 5, it will be seen that when the sifting receptacle is in the position shown in Fig. 1 that the sifting of the ashes may be accomplished by oscillating the handle 11 in the direction of the arrows *a*, ears 8 being so proportioned so that they will during an oscillating operation slide onto the curved portion 6 at the rear end of the pan 5. The sifting receptacle 9 at a point opposite the handle member 11 is provided with a handle member 12 which is adapted to be grasped by the hand of the operator after the sifting receptacle has been removed from the ash pit, thereby allowing the operator to firmly hold the sifting receptacle when the same is full of cinders.

Ears 8 have their horizontal portions 13 spaced from the bottom of the receptacle 9 so that the receptacle 9, during a sifting operation will be prevented from displacement and will be held in its proper position by means of the sides 7 of the receptacle 5. However sufficient play is provided between the sifting receptacle 9 and the inner faces of the flanges 7 so as to allow freedom of movement of the sifting receptacle 9 during a sifting operation. Secured to the inner faces of the sides 7 as at 14 are ears 15, which ears are substantially centrally disposed so that when the bail 16 is in an upright position after the sifting receptacle 9 has been removed the receptacle 5 will substantially balance on the pivotal points 17. However, the forward wall 18 of the receptacle 5 is provided with a handle member 19 which is adapted to be grasped by the operator for pulling the pan 5 out of the ash pit. Handle 19 also forms means whereby the operator may additionally hold the pan 5 after the same has been removed from the ash pit and is being carried by the operator and has his other hand in engagement with the bail 16.

From the above it will be seen that an ash sifter is provided wherein the sifting operation may be accomplished by a longitudinal oscillation of the sifting pan, or by an oscillating movement which will cause the sifting pan to be slightly rotated in one direction and then in the other direction. The advantage of the last named action being that the initial sifting of the ashes may be accomplished with the least amount of disturbance so as to reduce the amount of dust to a minimum. After the initial sifting operation and the cinders are partially free of dust the longitudinal reciprocating action of the sifting receptacle will cause the balance of the dust and fine particles to be separated from the cinders.

The invention having been set forth what is claimed as new and useful is:—

1. An ash sifter comprising a receptacle adapted to be disposed within an ash pit, said receptacle having one of its ends rounded, a sifting receptacle round in shape and of a smaller diameter than the radius of the rounded portion of the first mentioned receptacle, said sifting receptacle being provided with lugs at diametrically opposite sides thereof, said lugs engaging the upper marginal edges of the longitudinal sides of the receptacle and provided with downwardly extending lugs spaced from said longitudinal sides, and so mounted so that when the sifting receptacle is in the rounded end a limited rotary oscillation may be imparted to the sifting receptacle and when desired a longitudinal reciprocation may be imparted to the sifting receptacle, and means adapted to be grasped by the operator for moving the sifting receptacle during a sifting operation.

2. An ash sifter comprising a main receptacle, said main receptacle having one of its ends rounded, a round sifting receptacle of smaller radius than the radius of the round portion of the main receptacle, said sifting receptacle being provided with diametrically disposed lugs, said lugs being spaced from the bottom of the sifting receptacle so that the lower portion of the sifting receptacle will prevent displacement of the sifting receptacle during a sifting operation, said lugs being so constructed so that when the sifting receptacle is in the rounded end of the main receptacle a limited rotary oscillation may be imparted to the sifting receptacle, the lugs also being so constructed so that a longitudinal reciprocating movement may be imparted to the sifting receptacle as desired and a bail pivotally attached to the interior sides of the main receptacle at points below the bottom of the sifting receptacle.

In testimony whereof I have signed my name to this specification in the presence of two subscribing witnesses.

BERNARD M. MOSER.

Witnesses:
 O. B. RHYNER,
 W. H. ZARTER.